United States Patent [19]
Koh

[11] Patent Number: 5,331,128
[45] Date of Patent: Jul. 19, 1994

[54] APPARATUS FOR DRIVING MICROWAVE OVEN USING BOTH A.C. AND D.C. CURRENT

[75] Inventor: Hung-Chan Koh, Kunpo, Rep. of Korea

[73] Assignee: Samsung Electronics Co., Ltd., Suwon, Rep. of Korea

[21] Appl. No.: 85,829

[22] Filed: Jul. 6, 1993

[30] Foreign Application Priority Data

Jul. 3, 1992 [KR] Rep. of Korea ............... 92-11863
Jul. 28, 1992 [KR] Rep. of Korea ............... 92-13524

[51] Int. Cl.⁵ .................................................. H05B 6/68
[52] U.S. Cl. .................................... 219/717; 219/722
[58] Field of Search ................ 219/10.55 B, 10.55 C, 219/10.55 D, 10.55 E

[56] References Cited

U.S. PATENT DOCUMENTS

| | | | |
|---|---|---|---|
| 4,667,075 | 5/1987 | Sakurai | 219/10.55 B |
| 4,904,837 | 2/1990 | Low et al. | 219/10.55 B |
| 5,237,140 | 8/1993 | Akazawa et al. | 219/10.55 B |
| 5,250,775 | 10/1993 | Maehara et al. | 219/10.55 B |

Primary Examiner—Philip H. Leung
Attorney, Agent, or Firm—Burns, Doane, Swecker & Mathis

[57] ABSTRACT

An apparatus for driving a microwave oven, comprising a system controller for controlling the associated peripheral components in response to an output signal from an AC/DC sensing section, a first switching section for selecting one of external AC power and a DC power from battery and supplying the selected power to an interlock switch, a second switching section for supplying the AC power from the interlock switch to lamp and fan motor driving section, a switching control section for controlling the first and second switching sections in response to control signals from the system control section, a pulse generating section for alternately outputting pulses of the opposite levels in response to two pulse control signals from the system controller, a magnetron driving section for inputting the alternate pulses from the pulse generating section when the driving power to the microwave oven is DC and the AC power from the second switching section when the driving power to the microwave oven is AC and supplying desired voltages to filament and anode terminals of a magnetron, respectively, to drive the magnetron, and a lamp and fan motor drive pulse generating section.

11 Claims, 8 Drawing Sheets

APPARATUS FOR DRIVING MICROWAVE OVEN USING BOTH A.C. AND D.C. CURRENT

BACKGROUND OF THE INVENTION

1. Field of the Invention

The present invention relates in general to a microwave oven driving apparatus, and more particularly to an apparatus for driving a microwave oven using both alternating current (AC) and direct current (DC) power sources.

2. Description of the Prior Art

Figure 1:
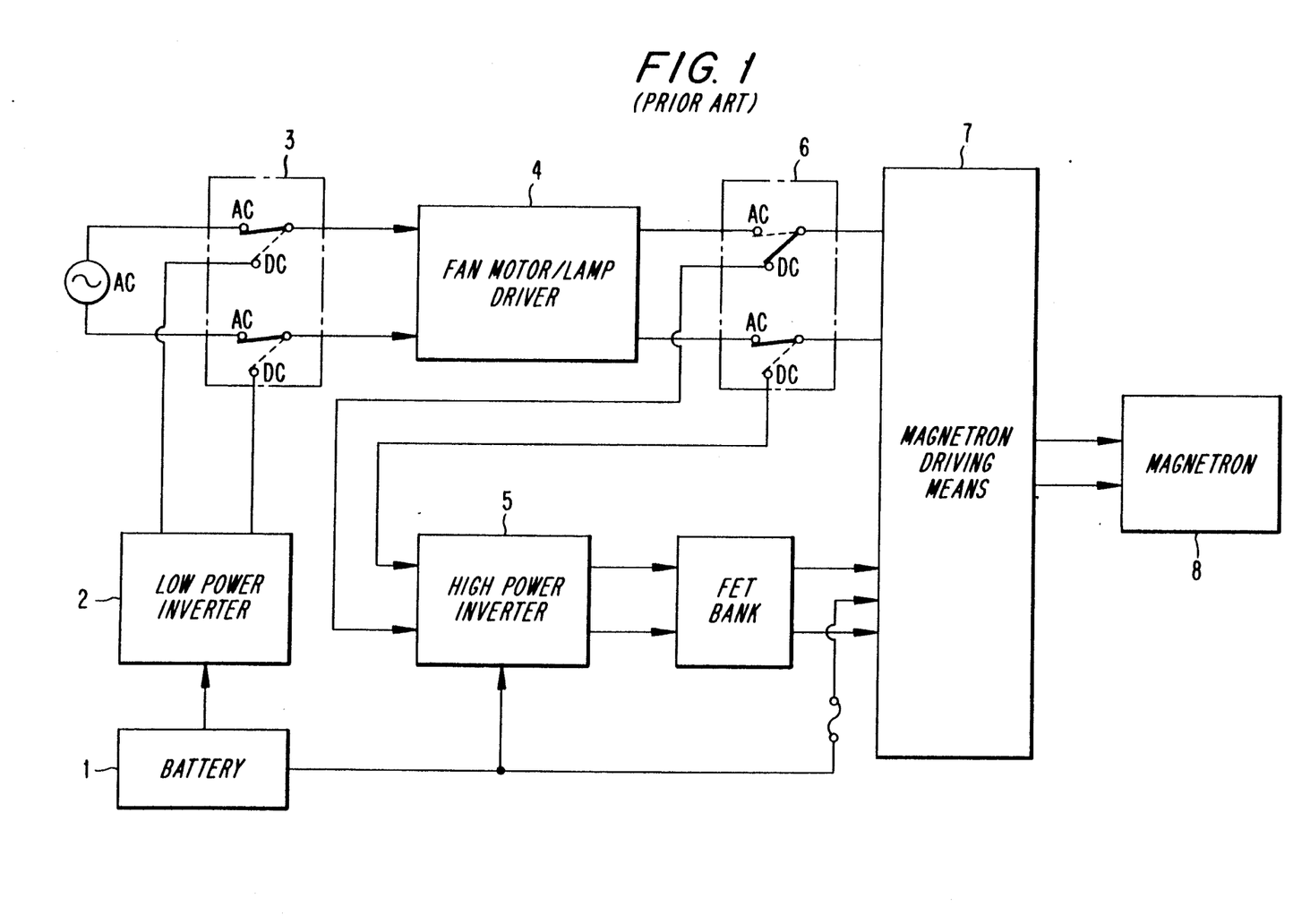
FIG. 1 is a block diagram of a conventional apparatus for driving a microwave oven.

One example of an apparatus for driving a microwave oven with both AC and DC power is disclosed in U.S. Pat. No. 4,904,837, and is shown in a block form in FIG. 1. As shown in this drawing, the conventional microwave oven driving apparatus comprises a high power inverter 5 for converting DC power supplied by actuation of a relay 6, into AC power. The high power inverter 5 is connected between a battery 1 and magnetron driving means 7 which drives a magnetron 8, so as to convert DC power from the battery 1 into AC power and supply desired voltages to filament and anode terminals of the magnetron 8, respectively. A low power inverter 2 is connected between the battery 1 and a relay 3 which is connected to one side of an interlock switch, so as to convert the DC power from the battery 1 into AC power and supply the AC power to a fan motor and lamp driver 4 which is connected to the other side of the interlock switch.

However, the conventional microwave oven driving apparatus with the above-mentioned construction has a disadvantage in that it is difficult to match the actuations of the high and low power inverters employed as means for costly AC relay results in an increase in the manufacturing cost.

SUMMARY OF THE INVENTION

Therefore, the present invention has been made in view of the above problems, and it is an object of the present invention to provide an apparatus for driving a microwave oven using both AC and DC power in which the circuit construction is simplified and the manufacturing cost is reduced by using DC current from a battery.

In an embodiment, the present invention provides an apparatus for driving a microwave oven, comprising: AC/DC sensing means for sensing whether a driving power supplied to the microwave oven is AC or DC and outputting the sensed result; system control means for controlling the associated peripheral components in response to an output signal from said AC/DC sensing means; first switching means connected to the front of an interlock switch which is interlocked according to an actuated state of a door of the microwave oven, said first switching means selecting one of external AC power and DC power from a battery and supplying the selected power to said interlock switch; second switching means connected to the rear of said interlock switch which is interlocked according to the actuated state of the door of the microwave oven, said second switching means for supplying AC power from said interlock switch to lamp and fan motor driving means; switching control means for controlling said first and second switching means, respectively, connected to the front and rear of said interlock switch in response to control signals from said system control means; pulse generating means for alternately outputting pulses of opposite levels in response to two pulse control signals which are outputted from said system control means when said AC/DC sensing means senses that the driving power to the microwave oven is DC; magnetron driving means for inputting the alternate pulses from said pulse generating means when the driving power to the microwave oven is DC and AC power from said second switching means when the driving power to the microwave oven is AC and supplying desired voltages to filament and anode terminals of a magnetron, respectively, to drive the magnetron, said magnetron driving means having a transformer for inducing the desired voltage supplied to the anode terminal of the magnetron to a relatively lower, high voltage; and lamp and fan motor drive pulse generating means for converting the voltage supplied to the anode terminal of the magnetron into a lamp and fan motor drive pulse in response to two frequency generation control signals from said system control means when the driving power to the microwave oven is DC.

In an alternative embodiment, the present invention provides an apparatus for driving a microwave oven comprising: first switching means connected to the front of an interlock switch which is interlocked according to an actuated state of a door of the microwave oven, said first switching means selecting one of an external AC power and DC power from a battery and supplying the selected power to said interlock switch; second switching means connected to the rear of said interlock switch which is interlocked according to the actuated state of the door of the microwave oven; DC/AC converting means for converting two DC signals inputted by a switching operation of said second switching means into two AC signals; pulse generating means for alternately outputting pulses of opposite levels in response to the two AC signals from said DC/AC converting means; magnetron driving means for generating magnetron driving voltages in response to the alternate pulses from said pulse generating means; and lamp and fan motor drive pulse generating means for inputting an output voltage from said magnetron driving means and applying the inputted voltage as a lamp and fan motor drive voltage to lamp and fan motor driving means.

BRIEF DESCRIPTION OF THE DRAWINGS

The above and other objects, features and advantages of the present invention will be more clearly understood from the following detailed description taken in conjunction with the accompanying drawings, in which:

FIGS. 6a to 6i are waveform diagrams of input and output signals to/from components in the lamp and fan motor drive pulse generating means in FIG. 5;

DETAILED DESCRIPTION OF THE PREFERRED EMBODIMENTS

Figure 2:
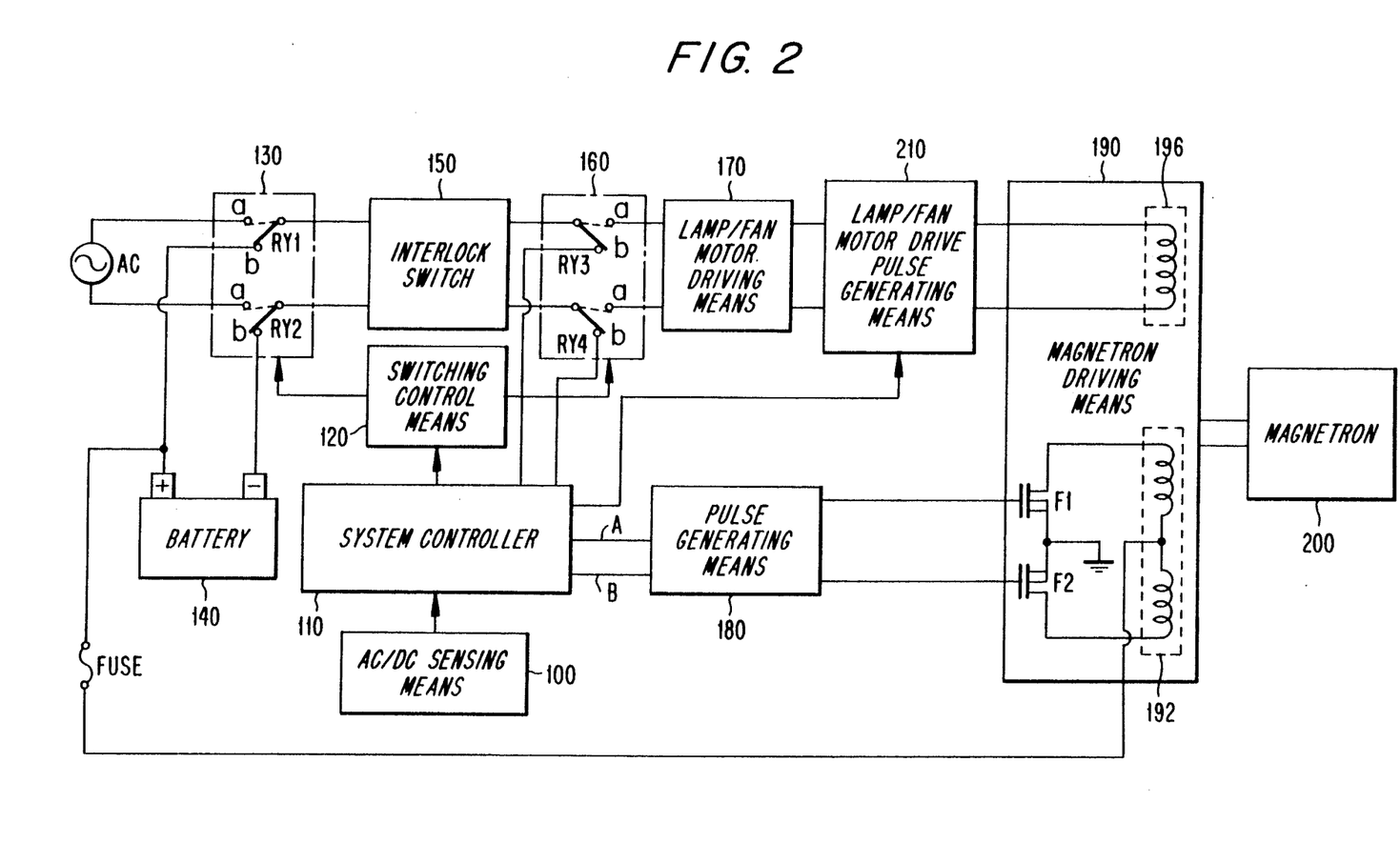
FIG. 2 is a block diagram of an apparatus for driving a microwave oven in accordance with an embodiment of the present invention.
Figure 4:
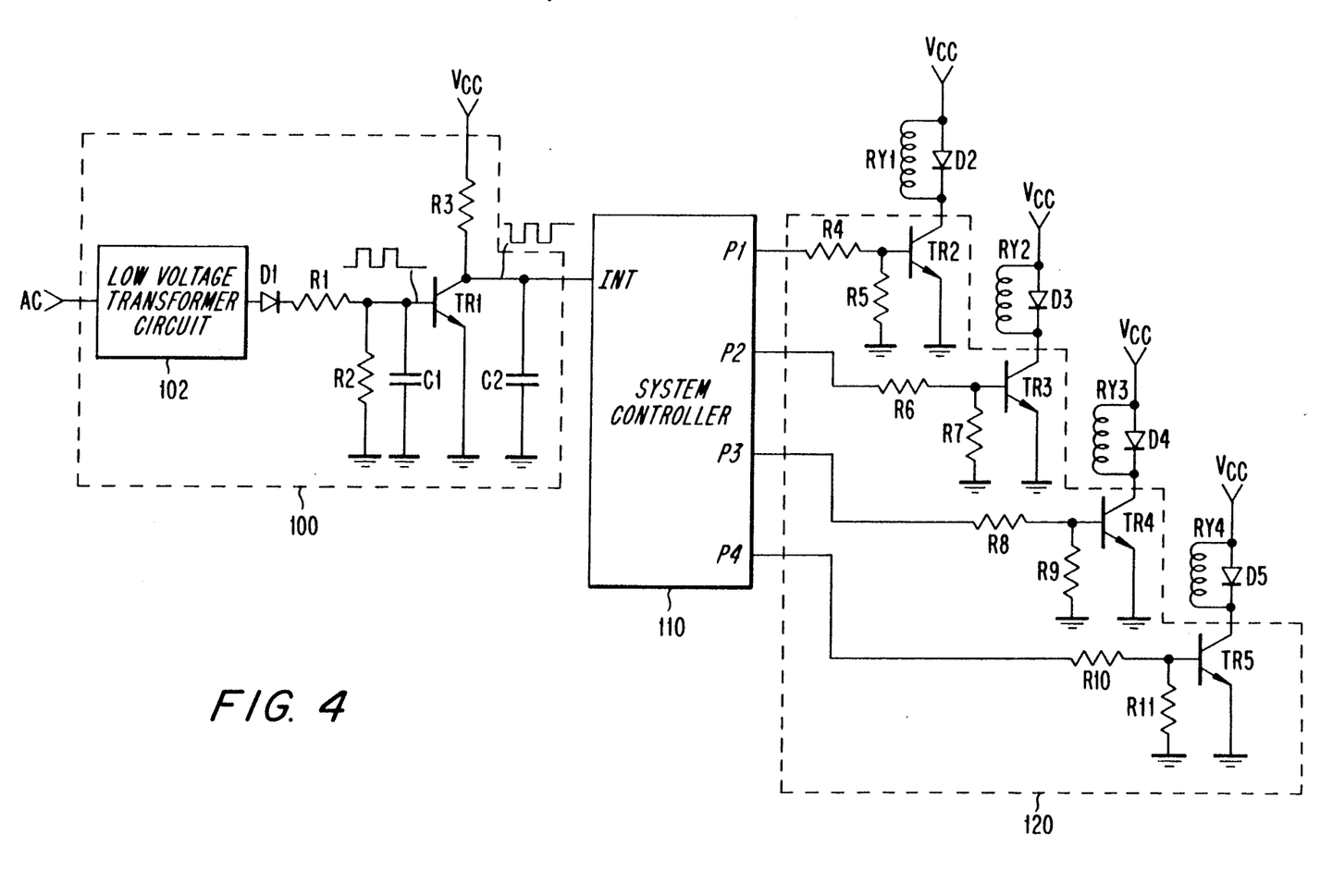
FIG. 4 is a detailed circuit diagram of AC/DC sensing means and switching control means in the apparatus in FIG. 2.
Figure 5:
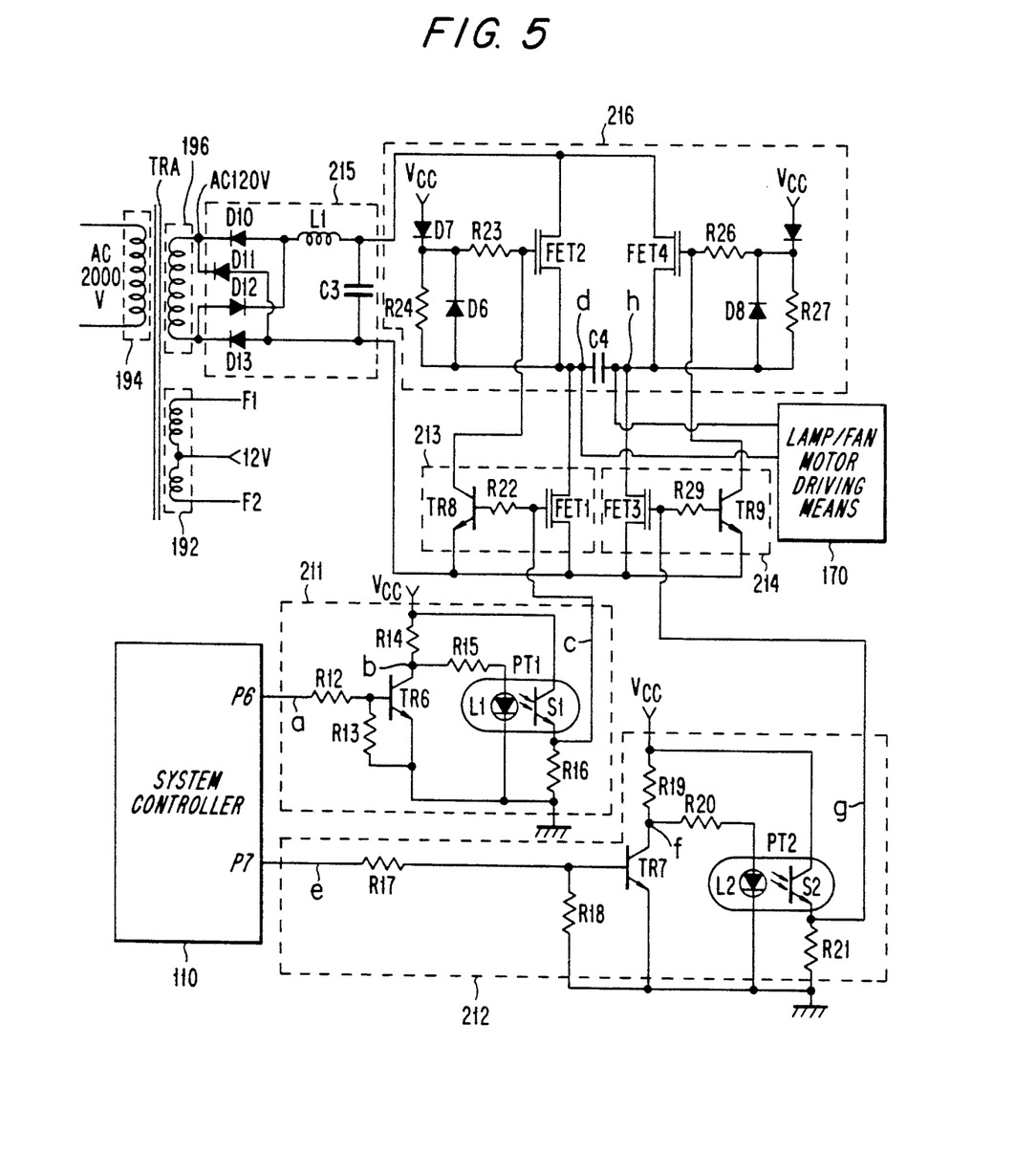
FIG. 5 is a detailed circuit diagram of lamp and fan motor drive pulse generating means in the apparatus in FIG. 2.
Figure 7:
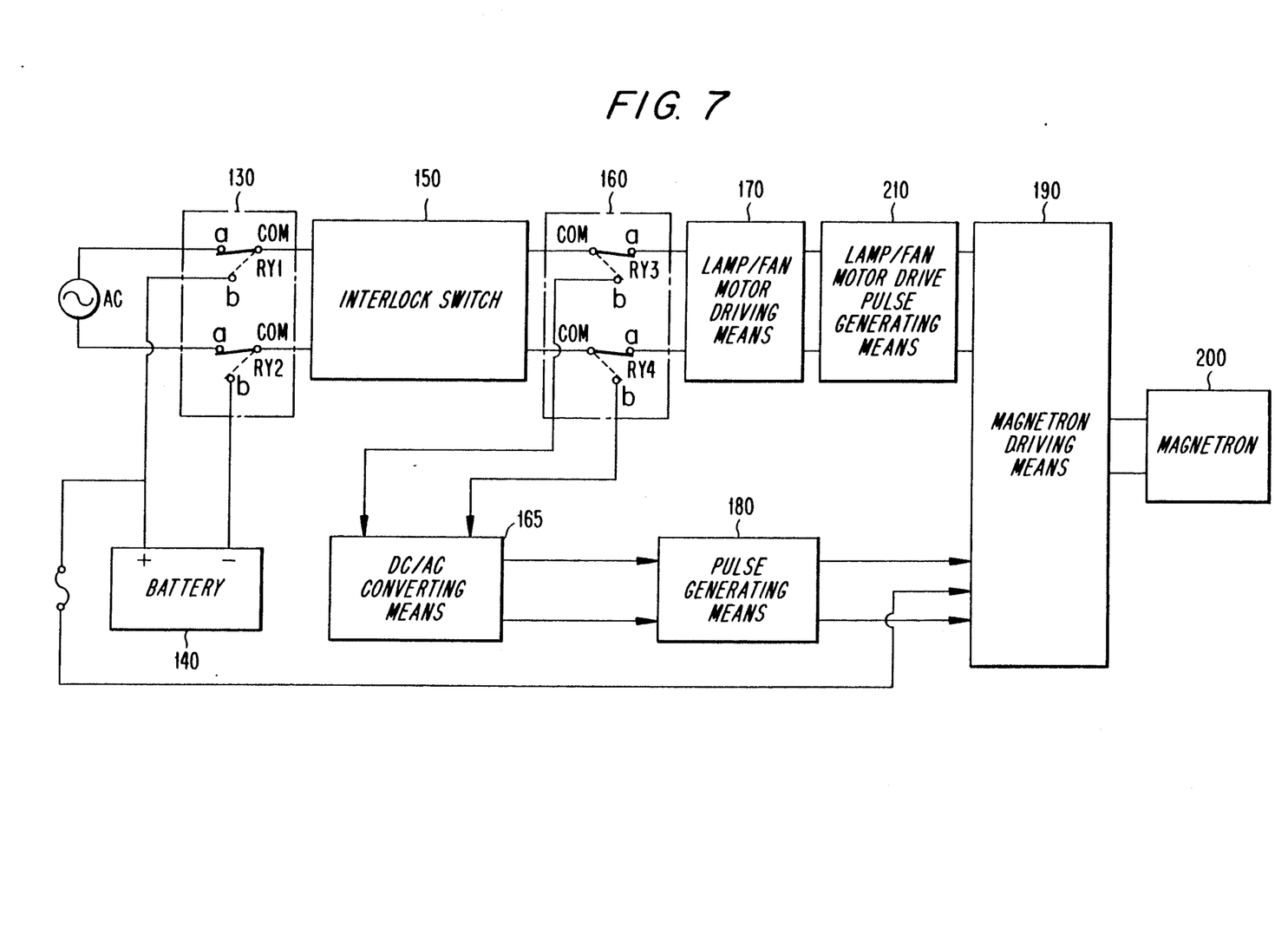
FIG. 7 is a block diagram of an apparatus for driving a microwave oven in accordance with an alternative embodiment of the present invention.
Figure 8:
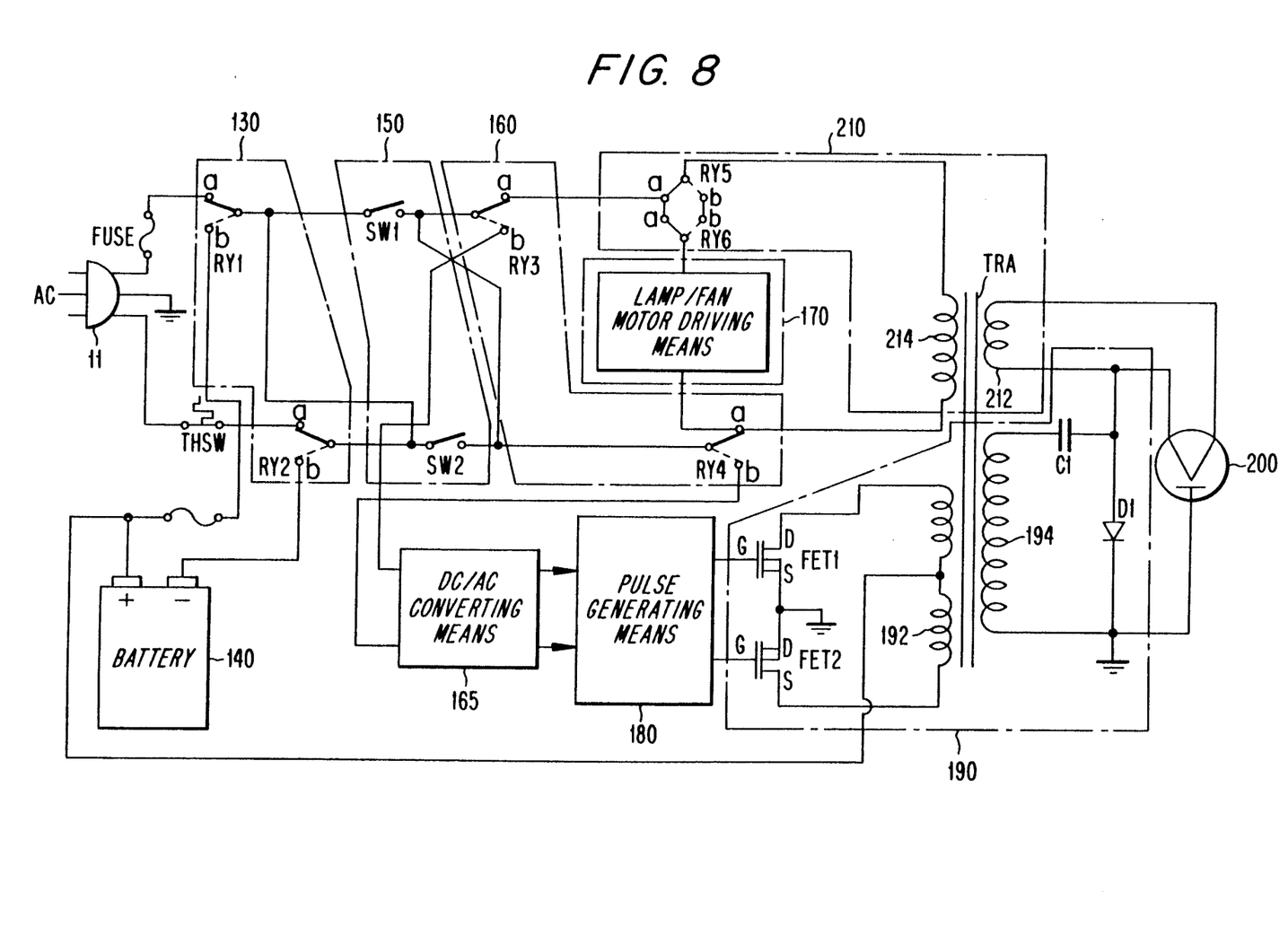
FIG. 8 is a detailed circuit diagram of the apparatus in FIG. 7.

FIG. 2 is a block diagram of an apparatus for driving a microwave oven in accordance with an embodiment of the present invention, FIG. 4 is a detailed circuit diagram of AC/DC sensing means 100 and switching control means 120 in FIG. 2, FIG. 5 is a detailed circuit diagram of lamp and fan motor drive pulse generating means 210 in FIG. 2, FIG. 7 is a block diagram of an apparatus for driving a microwave oven in accordance with an alternative embodiment of the present invention, and FIG. 8 is a detailed circuit diagram of the apparatus in FIG. 7.

In the first embodiment of the present invention, as shown in FIG. 2, the microwave oven driving apparatus comprises a system controller 110 for controlling the associated peripheral components in response to an output signal from the AC/DC sensing means 100, which senses whether a driving power used for the microwave oven is AC or DC and outputs the sensed result. The AC/DC sensing means 100, as shown in FIG. 4, includes a low voltage transformer circuit 102 for discriminating whether the driving power supplied to the microwave oven is AC or DC and outputting a fixed period of a square wave pulse when it is discriminated that the driving power is AC. The square wave pulse from the low voltage transformer circuit 102 is passed through a diode D1, an attenuator and a condenser C1. The attenuator is provided with a pair of resistors R1 and R2. The AC/DC sensing means 100 also includes a transistor TR1 for inputting the square wave pulse through the diode D1, the attenuator and the condenser C1 at its base terminal and switching a power source voltage Vcc according to a level of the input square wave pulse to supply an interrupt signal to an interrupt terminal INT of the system controller 110.

The microwave oven driving apparatus also comprises first switching means 130 connected to the front of an interlock switch 150 which is interlocked according to an actuated state of a door of the microwave oven. The first switching means 130 has relays RY1 and RY2 for selecting one of an external AC power source and DC power from a battery 140 and supplying the selected power to the interlock switch 150.

Second switching means 160 is connected to the rear of the interlock switch 150 which is interlocked according to the actuated state of the door of the microwave oven. The second switching means 160 has relays RY3 and RY4 for supplying the AC power from the interlock switch 150 to lamp and fan motor driving means 170.

The switching control means 120 is adapted to control the first and second switching means 130 and 160, respectively, connected to the front and rear of the interlock switch 150 in response to control signals from the system controller 110. As shown in FIG. 4, the switching control means 120 includes a plurality of transistors TR2-TR5, each for controlling a corresponding one of the relays RY1 and RY2 in the first switching means 130 and the relays RY3 and RY4 in the second switching means 160 by switching a relay drive voltage in response to a corresponding one of the control signals from output ports P1-P4 of the system controller 110. Each of the control signals from the output ports P1-P4 of the system controller 110 is applied to a base terminal of a corresponding one of the transistors TR2-TR5 through a corresponding one of attenuators in the switching control means 120. Each attenuator has a pair of resistors R4 and R5, R6 and R7, R8 and R9 or R10 and R11.

The microwave oven driving apparatus also comprises pulse generating means 180 for alternately outputting pulses of opposite levels in response to two pulse control signals which are outputted from the system controller 110 when the AC/DC sensing means 100 senses that the driving power to the microwave oven is DC and, thus, supplies no interrupt signal to the interrupt terminal INT of the system controller 110.

The microwave oven driving apparatus also comprises magnetron driving means 190 for inputting the alternate pulses from the pulse generating means 180 when the driving power to the microwave oven is DC and AC power from the second switching means 160 when the driving power to the microwave oven is AC and supplying desired voltages to filament and anode terminals of a magnetron 200, respectively, to drive the magnetron 200. The magnetron driving means 190 includes a transformer TRA for inducing the desired voltage (high voltage AC 2000 V) supplied to the anode terminal of the magnetron 200 to a relatively lower, high voltage (AC 120 V).

The lamp and fan motor drive pulse generating means 210 is adapted to convert the voltage supplied to the anode terminal of the magnetron 200 into a lamp and fan motor drive pulse in response to two frequency generation control signals from output ports of the system controller 110 when the driving power to the microwave oven is DC.

As shown in FIG. 5, the lamp and fan motor drive pulse generating means 210 includes first and second switching circuits 213 and 214, each for performing a switching operation according to a level of a corresponding one of the two frequency generation control signals from the output ports P6 and P7 of the system controller 110, and a rectifying circuit 215 for rectifying and smoothing the voltage (AC 120 V) induced in the transformer TRA in the magnetron driving means 190.

The lamp and fan motor drive pulse generating means 210 also includes a pulse generating circuit 216 for converting an output voltage from the rectifying circuit 215 into a square wave pulse according to the switching operations of the first and second switching circuits 213 and 214 and applying the square wave pulse as the lamp and fan motor drive pulse to the lamp and fan motor driving means 170, and first and second protecting circuits 211 and 212, each connected between a corresponding one of the frequency generation control signal output ports P6 and P7 of the system controller 110 and a corresponding one of the first and second switching circuits 213 and 214 to protect the system controller 110 from application of an instantaneous high voltage upon occurrence of an abnormal state.

In FIG. 5, the first and second protecting circuits 211 and 212 each is shown to comprise a transistor TR6 and TR7 for performing a switching operation according to a level of a corresponding one of the two frequency generation control signals from the output ports P6 and P7 of the system controller 110, and a photosensor PT1 or PT2 being turned on/off according to the switching operation of the transistor TR6 or TR7. The photosensors PT1 and PT2 each has a light receiving element connected to a corresponding one of the first and second switching circuits 213 and 214 to protect the system controller 110 from the application of the instantaneous high voltage (the high voltage from the rectifying circuit 215) upon the occurrence of the abnormal state.

The first and second switching circuits 213 and 214 each includes a transistor TR8 and TR9, respectively and a field effect transistor FET1 and FET3, respectively for performing switching operations in response to a bias voltage applied according to an operation of a corresponding one of the light receiving elements S1 and S2 of the photosensors PT1 and PT2 in the first and second protecting circuits 211 and 212.

The pulse generating circuit 216 includes a pair of field effect transistors FET2 and FET4, each for switching the high voltage from the rectifying circuit 215 according to a corresponding one of the switching operations of the transistors TR8 and TR9 in the first and second switching circuits 213 and 214 performed, respectively, by the operations of the photosensors PT1 and PT2 in the first and second protecting circuits 211 and 212, to output a fixed period of a square wave pulse, and a coupling condenser C4 for coupling the square wave pulses from the field effect transistors FET2 and FET4 with the remaining square wave pulse bypassed during turning-on of the field effect transistors FET1 and FET3 in the first and second switching circuits 213 and 214 and applying the coupled square wave pulse as the lamp and fan motor drive pulse to the lamp and fan motor driving means 170.

The operation of the microwave oven driving apparatus with the above-mentioned construction in accordance with the first embodiment of the present invention will hereinafter be described in detail with reference to FIG. 3 which is a flowchart illustrating the operation of the apparatus in FIG. 2.

Figure 3:
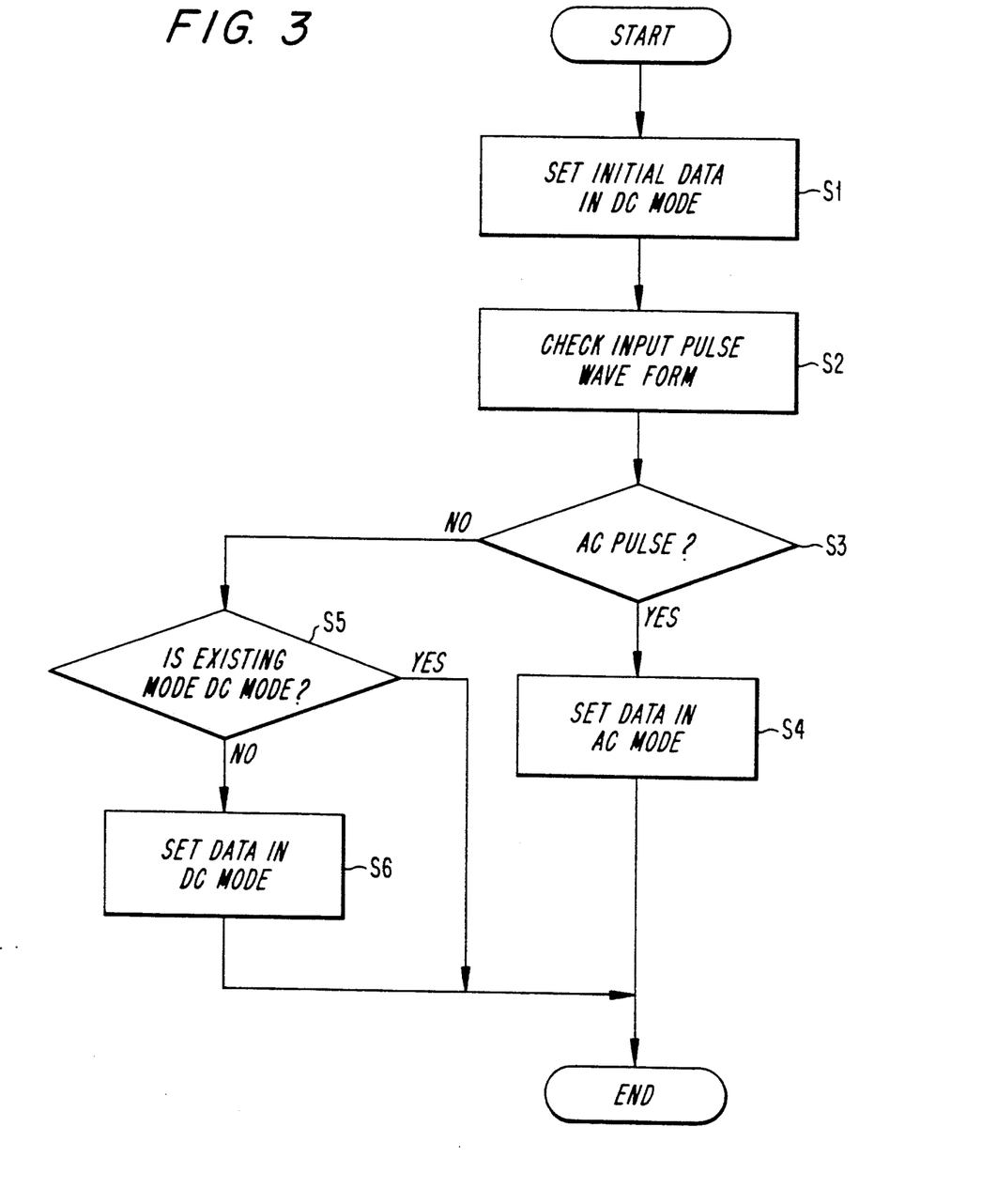
FIG. 3 is a flowchart illustrating an operation of the apparatus in FIG. 2.

When either the AC power supplied through an external line or the DC power charged on the battery 140 is applied to the microwave oven, the system controller 110 controls the associated peripheral components as shown in FIG. 3. The system controller 110 sets initial data in a DC mode at an initial state of the step S1 and checks at the step S2 whether the interrupt signal is applied to the interrupt terminal INT thereof. Then, the system controller 110 proceeds to the step S3 to determine whether the driving power supplied to the microwave oven is AC or DC by checking whether the interrupt signal is applied to the interrupt terminal INT thereof. The interrupt signal applied to the interrupt terminal INT of the system controller 110 is determined based on the operation of the transistor TR1 in the AC/DC sensing means 100. For example, when AC power is supplied to the microwave oven, it is converted into a desired level of a square wave pulse through the low voltage transformer circuit 102, the diode D1 and the resistors R1 and R2 of the attenuator and then applied to the base terminal of the transistor TR1. As a result, the interrupt signal of a low level is applied from the transistor TR1 to the interrupt terminal INT of the system controller 110. On the other hand, when DC power from the battery 140 is supplied to the microwave oven, a low signal is applied to the base terminal of the transistor TR1 in the AC/DC sensing means 100, thereby causing the transistor TR1 to apply a high signal to the interrupt terminal INT of the system controller 110.

If it is determined at the step S3 that the driving power supplied to the microwave oven is DC, the system controller 110 proceeds to the step S5 to discriminate whether the existing mode is the DC mode. If it is discriminated at the step S5 that the existing mode is not the DC mode, the system controller 110 sets data in the DC mode at the step S6. On the other hand, if it is discriminated at the step S3 that the driving power supplied to the microwave oven is AC, the system controller 110, at the step S4, sets data in an AC mode and controls the switching control means 120, the lamp and fan motor driving means 170 and the associated peripheral components in accordance with the set data.

By the way, under the condition that the driving power to the microwave oven is DC at the step S3 and the data is set in the DC mode, low signals from the output ports P1-P4 of the system controller 110 are applied to the base terminals of the transistors TR2-TR5 in the switching control means 120, respectively, thereby forcing the transistors TR2-TR5 to be turned off. Since the relays RY1 and RY2 in the first switching means 130 and the relays RY3 and RY4 in the second switching means 160 are not actuated as a result of the turning-off of the transistors TR2-TR5, their movable contact terminals are connected to their one fixed contact terminals b, respectively. As a result, the DC power charged in the battery 140 is applied to an input port of the system controller 110 through the interlock switch 150. Upon inputting the DC power, the system controller 110 outputs the pulse control signals A and B through its output ports to the pulse generating means 180. In response to the pulse control signals A and B from the system controller 110, the pulse generating means 180 outputs alternately the pulses of opposite levels to field effect transistors F1 and F2 in the magnetron driving means 190, respectively. The field effect transistors F1 and F2 are alternately turned on by the alternate pulses from the pulse generating means 180, resulting in generation of a square wave pulse in a primary coil 192 of the transformer TRA, a secondary coil 194 of which thus induces the square wave pulse in the primary coil 192 to the high voltage. In result, the magnetron 200 is driven by the high voltage induced in the secondary coil 194 of the transformer TRA.

Then, there will be described the operation of driving the lamp and the fan motor in the microwave oven using the DC voltage charged in the battery 140.

Figure 6A:
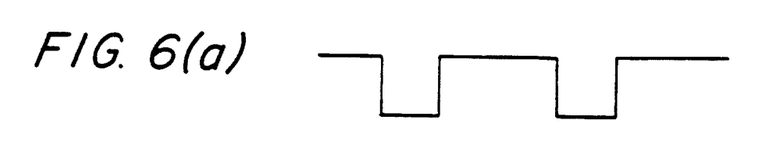
Figure 6B:
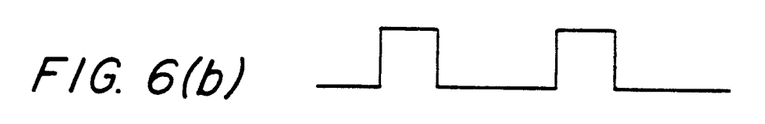
Figure 6C:
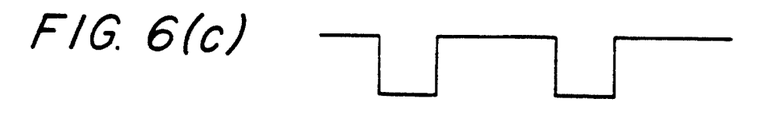
Figure 6D:
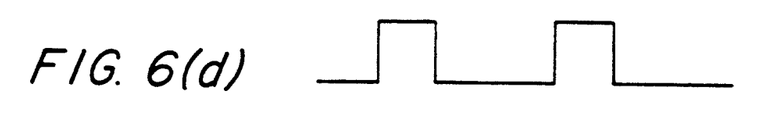
Figure 6E:
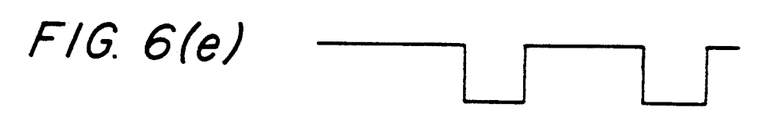
Figure 6F:
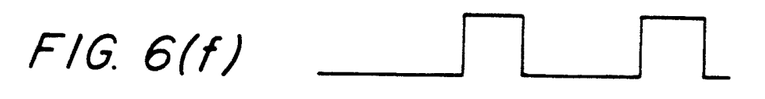
Figure 6G:
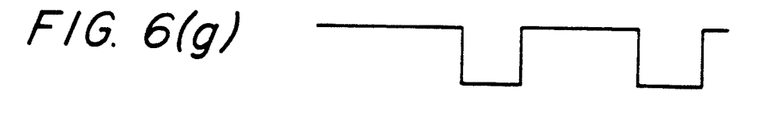

Upon application of a no interrupt signal from the AC/DC sensing means 100 shown in FIGS. 2 and 4, the frequency generation control signals of waveforms as shown in FIGS. 6a and 6e are applied from the output ports P6 and P7 of the system controller 110 to the first and second protecting circuits 211 and 212 in the lamp and fan motor drive pulse generating means 210 shown in FIG. 5, respectively. In this case, the transistors TR6 and TR7 in the first and second protecting circuits 211 and 212 are turned on during high intervals of the frequency generation control signals shown in FIGS. 6a and 6e, respectively. At this time, signals of waveforms as shown in FIGS. 6b and 6f are output from collector terminals of the transistors TR6 and TR7 to light emitting elements L1 and L2 of the photosensors PT1 and PT2, respectively. As a result, the light emitting elements L1 and L2 of the photosensors PT1 and PT2 are turned off and the light receiving elements S1 and S2 thereof are thus turned off. Due to the turning-off of the photosensors PT1 and PT2 in the first and second protecting circuits 211 and 212, a signal of waveform as shown in FIG. 6c is applied to a base terminal of the transistor TR8 and a gate terminal of the field effect transistor FET1 as switching devices in the first switching circuit 213. Also, a signal of waveform as shown in FIG. 6g is applied to a base terminal of the transistor TR9 and a gate terminal of the field effect transistor FET3 as switching devices in the second switching circuit 213. As a result, the switching devices in the first and second switching circuits 213 and 214 are turned on during high intervals of the signals of waveforms shown in FIGS. 6c and 6g.

By the way, in the lamp and fan motor drive pulse generating means 210, the rectifying circuit 215 is connected to a primary coil 196 of the transformer TRA, which again induces the high voltage (AC 2000 V) induced in the secondary coil 194 to the relatively lower, high voltage (AC 120 V). The rectifying circuit 215 serves to rectify and smooth the high voltage (AC 120 V) in the primary coil 196 of the transformer TRA and to apply the rectified and smoothed high voltage to source terminals of the field effect transistors FET2 and FET4 in the pulse generating circuit 216.

Figure 6H:
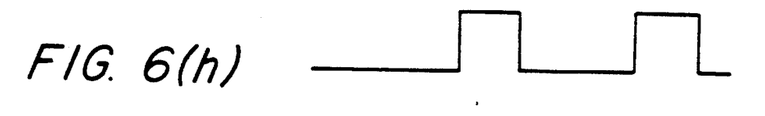
Figure 6I:
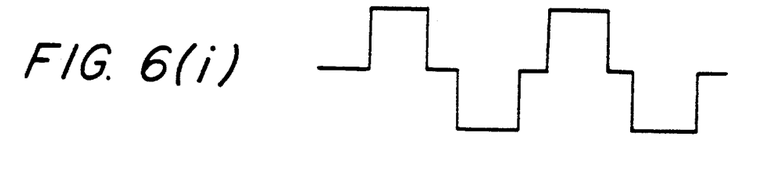

The field effect transistors FET2 and FET4 are turned on when the transistors TR8 and TR9 in the first and second switching circuits 213 and 214 are turned off, thereby causing the voltages at the source terminals thereof to be outputted through their drain terminals. Because the voltage levels at the drain terminals of the field effect transistors FET2 and FET4 are low when the field effect transistors FET1 and FET3 FET4 are low when the field effect transistors FET1 and FET3 in the first and second switching circuits 213 and 214 are turned on, signals of waveforms as shown in FIGS. 6d and 6h are outputted from the drain terminals of the field effect transistors FET2 and FET4 and then applied across the coupling condenser C4. As a result, a voltage of commercial frequency as shown in FIG. 6i is applied from the condenser C4 to the lamp and fan motor driving means 170, which then drives the lamp and fan motor with the applied commercial frequency voltage.

On the other hand, under the condition that the driving power to the microwave oven is AC at the step S3 in FIG. 3 and the data is set in the AC mode at the step S4, high signals from the output ports P1-P4 of the system controller 110 shown in FIG. 4 are applied to the base terminals of the transistors TR2-TR5 in the switching control means 120, respectively, thereby forcing the transistors TR2—TR5 to be turned on. Since the relays RY1 and RY2 in the first switching means 130 and the relays RY3 and RY4 in the second switching means 160 are actuated as a result of the turning-on of the transistors TR2-TR5, their movable contact terminals are connected to their other fixed contact terminals a, respectively. As a result, the AC power supplied through the external line is applied through the interlock switch 150 to the lamp and fan motor driving means 170 and to the primary coil 196 of the transformer TRA in the magnetron driving means 190.

In the second embodiment of the present invention, as shown in FIGS. 7 and 8, the first switching means 130 is connected to the front of the interlock switch 150 having a pair of switches SW1 and SW2 which are interlocked according to the actuated state of the door of the microwave oven. The first switching means 130 has the relays RY1 and RY2 for selecting one of the external AC power and the DC power on the battery 140 and supplying the selected power to the interlock switch 150. Each relay RY1 and RY2 has the movable contact terminal connected to the switch SW1 or SW2 of the interlock switch 150 and the fixed terminals a and b connected, respectively, to the AC and DC power sources.

The second switching means 160 includes the relays RY3 and RY4, each having the movable contact terminal connected to the switch SW1 or SW2 of the interlock switch 150.

DC/AC converting means 165 has input terminals connected to the fixed contact terminals b of the relays RY3 and RY4 of the second switching means 160. The DC/AC converting means 165 is adapted to convert two DC signals input by the switching operation of the second switching means 160 into two AC signals.

The pulse generating means 180 is adapted to alternately output pulses of the opposite levels in response to the two AC signals from the DC/AC converting means 165.

The magnetron driving means 190 is adapted to generate the magnetron driving voltages in response to the alternate pulses from the pulse generating means 180. As shown in FIG. 8, the magnetron driving means 190 includes the field effect transistors FET1 and FET2 being alternately turned on by the alternate pulses from the pulse generating means 180, to alternately bypass a DC voltage applied to a central tap of the primary DC coil 192 of the transformer TRA, so as to generate a square wave pulse of AC type in the primary DC coil 192. The secondary AC coil 194 of the transformer TRA serves to induce the square wave pulse generated in the primary DC coil 192 to a high voltage and to apply the induced high voltage to the anode terminal of the magnetron 200.

In the lamp and fan motor drive pulse generating means 210, the filament coil 212 of the transformer TRA serves to induce the square wave pulse generated in the primary DC coil 192 to a low voltage and to apply the induced low voltage to the filament terminal of the magnetron 200. Also, the primary AC coil 214 of the transformer TRA serves to induces the square wave pulse generated in the primary DC coil 192 to a desired voltage and to output the induced voltage externally.

The lamp and fan motor driving means 170 is connected to the other fixed contact terminals a of the relays RY3 and RY4 in the second switching means 160 so that it is actuated by the AC voltage applied by the switching operation of the second switching means 160.

The operation of the microwave oven driving apparatus with the above-mentioned construction in accordance with the second embodiment of the present invention will hereinafter be described in detail.

First, when the user connects a power cord 11 shown in FIG. 8 to an AC power source and closes the door of the microwave oven, the switches SW1 and SW2 of the interlock switch 150 are turned on. Under this condition, when the user selects desired operating switches (not shown), the AC power is supplied to the fixed contact terminals a of the relays RY1 and RY2 in the first switching means 130, respectively, through a fuse and a temperature sensor THSW. The relays RY1 and RY2 are AC relays which select the AC power by switching their movable contact terminals from their fixed contact terminals b to their fixed contact terminals a upon the application of the AC power.

The AC power selected by the relays RY1 and RY2 is applied to the fixed contact terminals a of the relays RY3 and RY4 in the second switching means 160 being actuated in a similar manner to those of the relays RY1 and RY2, respectively, through the switches SW1 and SW2 of the interlock switch 150.

Under the condition that the AC power is applied to the fixed contact terminal a of the relay RY3, the movable contact terminals of the relays RY5 and RY6 are connected to the fixed contact terminals a thereof. As a result, the AC power is applied to the lamp and fan motor driving means 170, so as to drive the lamp and fan motor. Also, the AC power is applied across the primary AC coil 214 of the transformer TRA in the magnetron driving means 190.

Upon application of the AC power across the primary AC coil 214 of the transformer TRA, the desired voltages are applied to the filament and anode terminals of the magnetron 200, respectively, based on the turning ratios of the filament coil 212 and the secondary AC coil 194.

By the way, when the user closes the door of the microwave oven and selects the desired operating switches at the initial state that the movable contact terminals of the relays RY1-RY6 are connected to the fixed contact terminals b thereof, to drive the microwave oven using the DC power charged on the battery 140, a DC voltage from a plus (+) terminal of the battery 140 is applied to one of the input terminals of the DC/AC converting means 165 through the relay RY1, the switch SW1 and the relay RY3 and a DC voltage from a minus (−) terminal of the battery 140 is applied to the other input terminal of the DC/AC converting means 165 through the relay RY1, the switch SW1 and the relay RY3. Upon inputting the DC voltages from the battery 140 in this manner, the DC/AC converting means 165 converts the inputted DC voltages into AC voltages and applies the converted AC voltages to the pulse generating means 180.

The pulse generating means 180 alternately outputs the pulses of the opposite levels in response to the two AC signals from the DC/AC converting means 165, to the magnetron driving means 190. It the magnetron driving means 190, the field effect transistors FET1 and FET2 are alternately turned on by the alternate pulses from the pulse generating means 180, thereby causing the DC voltage applied to the central tap of the primary DC coil 192 of the transformer TRA to be alternately bypassed. As a result, an AC type square wave pulse is generated in the primary DC coil 192. The secondary AC coil 194 of the transformer TRA induces the square wave pulse generated in the primary DC coil 192 to the high voltage and applies the induced high voltage to the anode terminal of the magnetron 200. Also, the filament coil 212 of the transformer TRA induces the square wave pulse generated in the primary DC coil 192 to the low voltage and applies the induced low voltage to the filament terminal of the magnetron 200.

On the other hand, the primary AC coil 214 of the transformer TRA induces the square wave pulse generated in the primary DC coil 192 to the desired voltage. The induced voltage from the primary coil 214 of the transformer TRA is applied as the lamp and fan motor drive voltage to the lamp and fan motor driving means 170 through the relays RY5 and RY6, so as to drive the lamp and fan motor.

As hereinbefore described, according to the present invention, there is provided apparatus which is capable of driving the microwave oven using both AC power supplied through the external line and DC power charged in the battery. Furthermore, the circuit construction is simplified and the manufacturing cost is reduced in the case of driving the microwave oven using the DC power.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for driving a microwave oven, comprising:

AC/DC sensing means for sensing whether a driving power supplied to the microwave oven is AC or DC and outputting the sensed result;

system control means connected to said AC/CD sensing means for controlling associated peripheral components in response to an output signal from said AC/CD sensing means and for outputting pulse control signals when said AC/DC sensing means senses that the driving power to the microwave oven is DC;

an interlock switch adapted to be interlocked according to an actuated state of a door of the microwave oven;

first switching means connected to said interlock switch, an external AC power source and a battery for selecting one of the external AC power source or DC power from the battery and supplying power from the selected power source to said interlock switch;

second switching means connected to said interlock switch and a lamp and fan motor driving means for supplying the AC power from said interlock switch to the lamp and fan motor driving means;

switching control means connected to said first and second switching means and to said system control means for controlling said first and second switching means in response to control signals from said system control means;

pulse generating means connected to said system control means for alternately outputting pulses of opposite levels in response to the pulse control signals outputted from said system control means;

magnetron driving means connected to said pulse generating means for inputting the alternate pulses from said pulse generating means when the driving power to the microwave oven is DC and AC power from said second switching means when the driving power to the microwave oven is AC and supplying desired voltages to filament and anode terminals of a magnetron, respectively, to drive the magnetron, said magnetron driving means having a transformer for inducing the desired voltage supplied to the anode terminal of the magnetron to a relatively lower high voltage; and lamp and fan motor drive pulse generating means connected to said lamp and fan motor driving means and said system control means for converting the voltage supplied to the anode terminal of the magnetron into a lamp and fan motor drive pulse in response to frequency generation control signals from said system control means when the driving power to the microwave oven is DC.

2. An apparatus for driving a microwave oven, as set forth in claim 1, wherein said AC/DC sensing means includes:

a low voltage transformer circuit for discriminating whether the driving power supplied to the microwave oven is AC or DC and outputting a fixed period of a square wave pulse when it is discriminated that the driving power is AC;

a diode connected to an output of said low voltage transformer circuit;

an attenuator connected to an output of said diode and comprising a pair of resistors;

a condenser connected to said attenuator; and a transistor for inputting the square wave pulse through the diode, the attenuator and the condenser at its base terminal and switching a power source voltage according to a level of the input square wave pulse to supply an interrupt signal to an interrupt terminal of said system control means.

3. An apparatus for driving a microwave oven, as set forth in claim 1, wherein said switching control means includes:

a plurality of transistors, each for controlling a corresponding one of relays of said first and second switching means in response to a corresponding one of control signals from output ports of said system control means.

4. An apparatus for driving a microwave oven, as set forth in claim 1, wherein said system control means includes output ports for outputting two frequency generation control signals and wherein said lamp and fan motor drive pulse generating means includes:

first and second switching circuits, each for performing a switching operation according to a level of a corresponding one of the two frequency generation control signals from the output ports of said system control means;

a rectifying circuit for rectifying and smoothing the high voltage induced in said transformer in said magnetron driving means;

a pulse generating circuit for converting an output voltage from said rectifying circuit into a square wave pulse according to the switching operations of said first and second switching circuits and applying the square wave pulse as the lamp and fan motor drive pulse to the lamp and fan motor driving means; and first and second protecting circuits, each connected between a corresponding one of the frequency generation control signal output ports of said system control means and a corresponding one of said first and second switching circuits to protect said system control means from application of an instantaneous high voltage upon occurrence of an abnormal state.

5. An apparatus for driving a microwave oven, as set forth in claim 4, wherein said first and second protecting circuits each includes:

a transistor for performing a switching operation according to a level of a corresponding one of the frequency generation control signals from the output ports of said system control means; and a photosensor adapted to be turned on/off according to the switching operation of said transistor, said photosensor having a light receiving element connected to a corresponding one of said first and second switching circuits to protect said system control means from the application of the instantaneous high voltage upon the occurrence of the abnormal state.

6. An apparatus for driving a microwave oven, as set forth in claim 4, wherein said first and second switching circuits each includes:

a transistor and a field effect transistor for performing switching operations in response to a bias voltage applied according to an operation of a corresponding one of said first and second protecting circuits.

7. An apparatus for driving a microwave oven, as set forth in claim 4, wherein said pulse generating circuit includes:

a pair of field effect transistors, each for switching the high voltage from said rectifying circuit according to a corresponding one of the switching operations of said first and second switching circuits performed, respectively, by the operations of said first and second protecting circuits, to output a fixed period of a square wave pulse; and a coupling condenser for coupling the square wave pulses from said field effect transistors with the remaining square wave pulse bypassed during the switching operations of said first and second switching circuits and applying the coupled square pulse as the lamp and fan motor drive pulse to the lamp and fan motor driving means.

8. An apparatus for driving a microwave oven, as set forth in claim 1, wherein said frequency generation controls signals from said system control means have the same period as that of a commercial frequency voltage used for a lamp and a fan motor.

9. An apparatus for driving a microwave oven, comprising:

first switching means connected an interlock switch which is interlocked according to an actuated state of a door of the microwave oven, said first switching means selecting one of an external AC power and a DC power from a battery and supplying the selected power to said interlock switch;

second switching means connected to said interlock switch for outputting said selected power;

DC/AC converting means connected to said second switching means for converting DC signals input by a switching operation of said second switching means into AC signals;

pulse generating means connected to said DC/AC converting means for alternately outputting pulses of opposite levels in response to the AC signals from said DC/AC converting means;

magnetron driving means connected to said pulse generating means for generating magnetron driving voltages in response to the alternate pulses from said pulse generating means; and lamp and fan motor drive pulse generating means connected to said magnetron driving means for inputting an output voltage from said magnetron driving means and applying the input voltage as a lamp and fan motor drive voltage to lamp and fan motor driving means.

10. An apparatus for driving a microwave oven, as set forth in claim 9, wherein said magnetron driving means includes:

a pair of field effect transistors being alternately turned on by the alternate pulses from said pulse generating means, to alternately bypass a DC voltage applied to a central tap of a primary DC coil, so as to generate a square wave pulse of AC type in said primary DC coil; and a secondary AC coil for including the square wave pulse generated in said primary DC coil to a high voltage and applying the induced high voltage to an anode terminal of a magnetron.

11. An apparatus for driving a microwave oven, as set forth in claim 9, wherein said lamp and fan motor drive pulse generating means includes:

a filament coil for inducing a square wave pulse generated in a primary DC coil to a low voltage and applying the induced low voltage to a filament terminal of a magnetron;

a primary AC coil for inducing the square wave pulse generated in said primary DC coil to a desired voltage and outputting the induced voltage externally.

* * * * *